April 26, 1960    F. H. CZAPLINSKI ET AL    2,933,815
ADJUSTABLE SETTING MASTER FOR DIAL BORE GAGES
Filed March 6, 1957    3 Sheets-Sheet 1
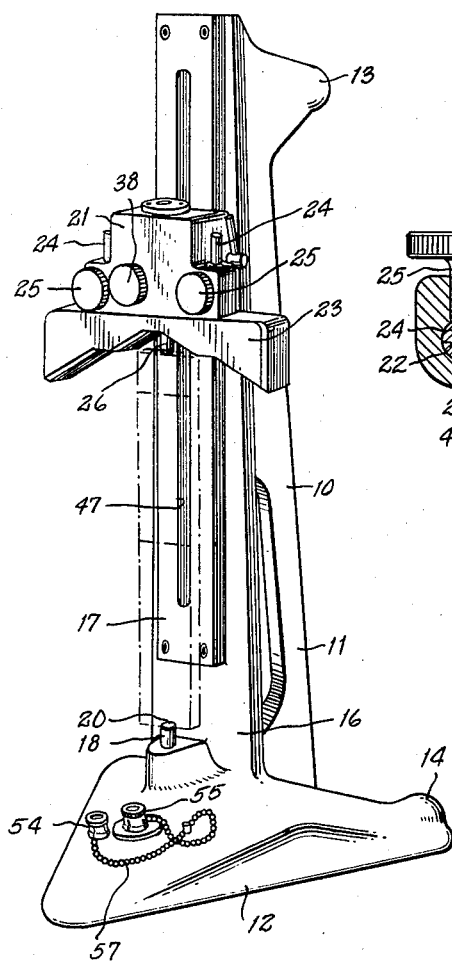
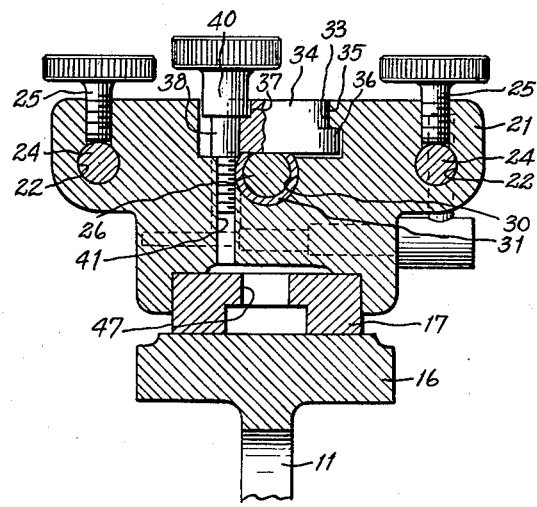
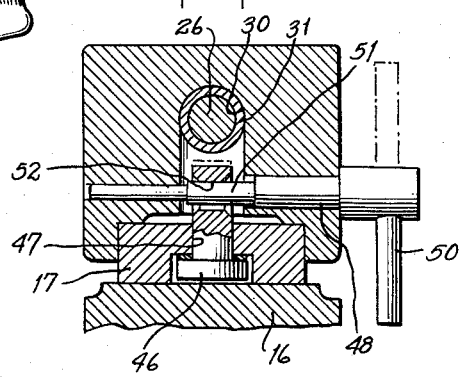
INVENTORS
FRANK H. CZAPLINSKI
EUGENE T. FIELD
BY
*Darby & Darby*
ATTORNEYS

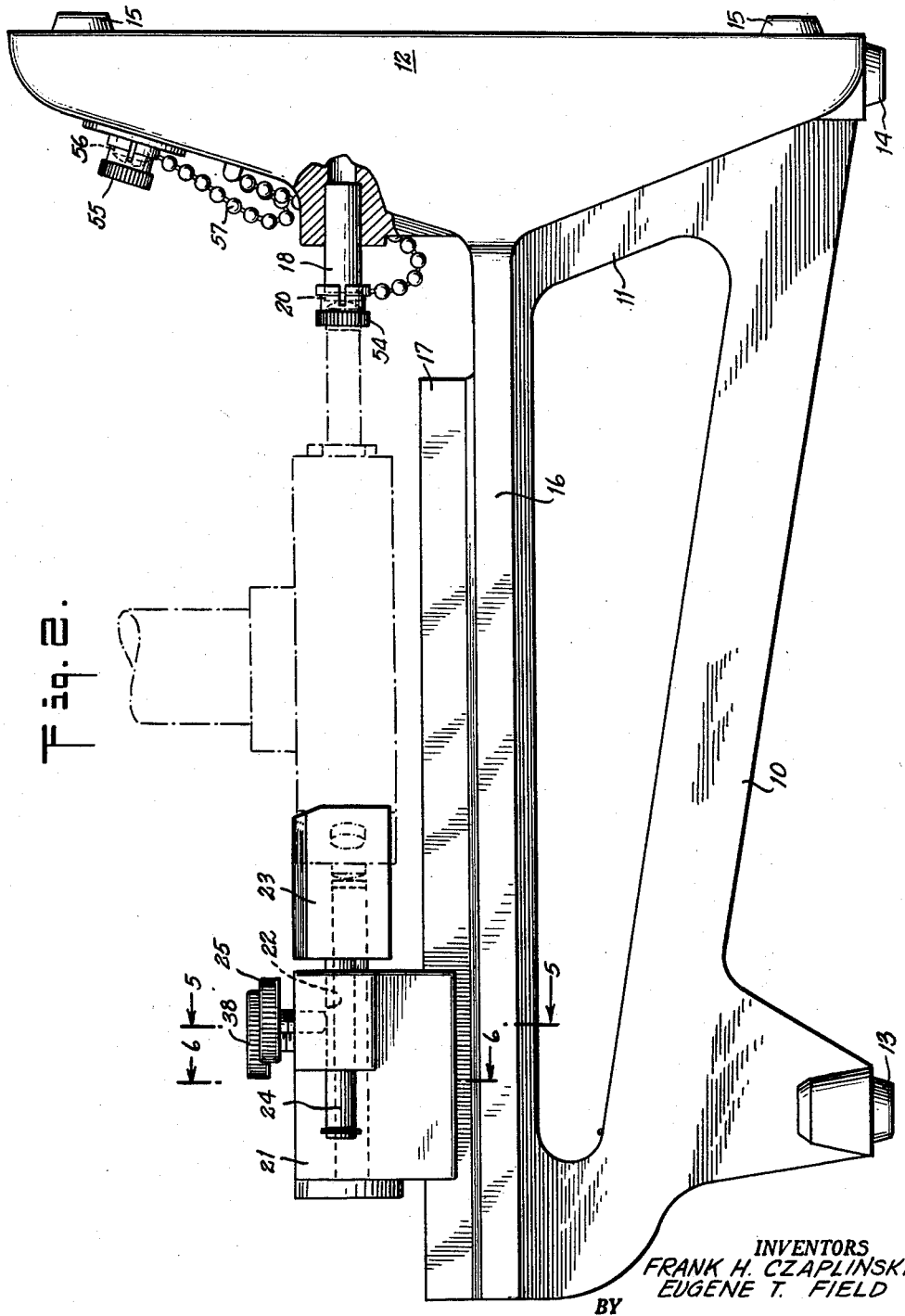

April 26, 1960     F. H. CZAPLINSKI ET AL     2,933,815
ADJUSTABLE SETTING MASTER FOR DIAL BORE GAGES
Filed March 6, 1957     3 Sheets-Sheet 3
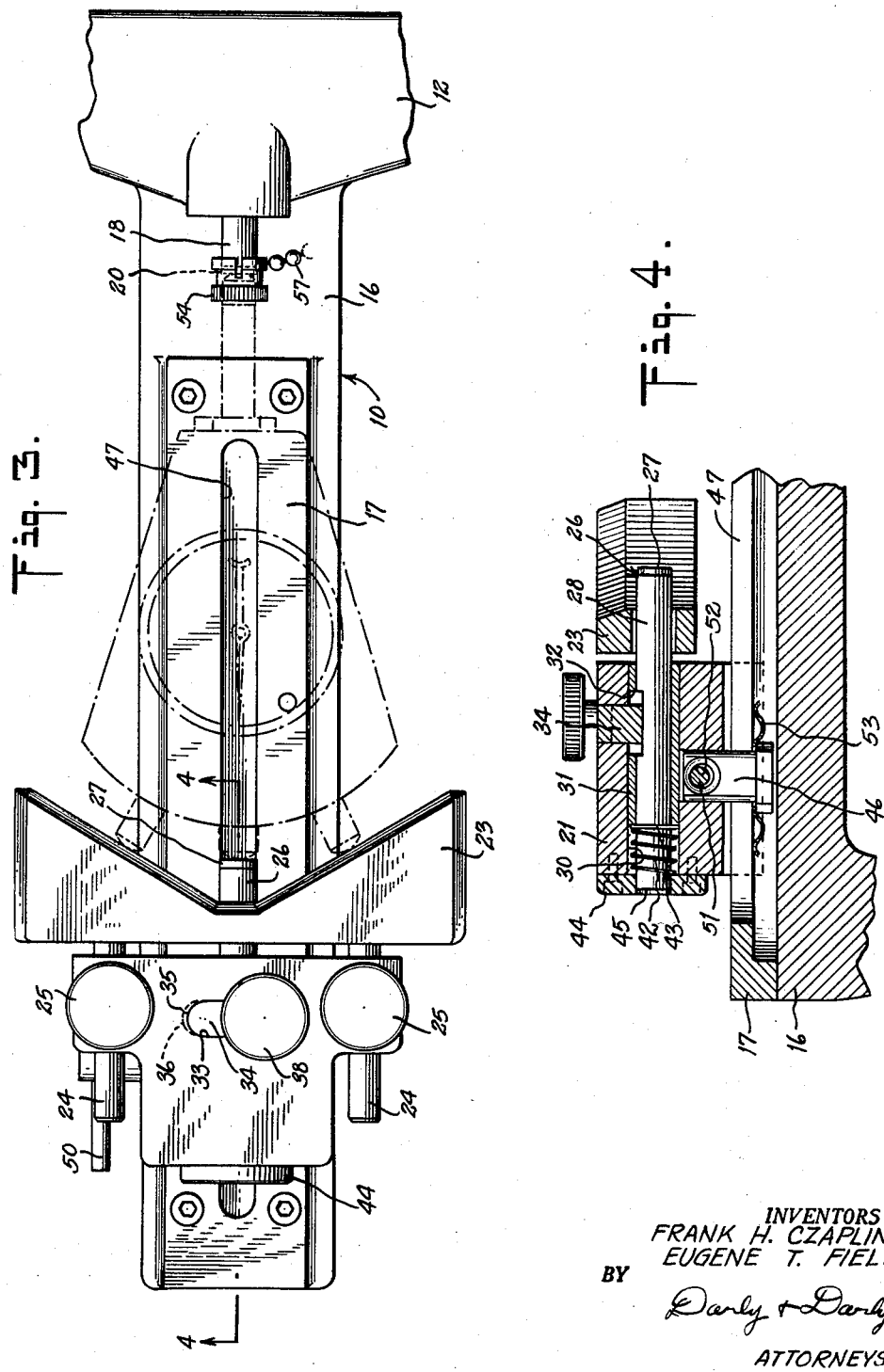
INVENTORS
FRANK H. CZAPLINSKI
EUGENE T. FIELD
BY
Darby & Darby
ATTORNEYS

United States Patent Office 2,933,815
Patented Apr. 26, 1960

2,933,815

ADJUSTABLE SETTING MASTER FOR DIAL BORE GAGES

Frank H. Czaplinski and Eugene T. Field, Poughkeepsie, N.Y., assignors to Standard Gage Company, Inc., Poughkeepsie, N.Y., a corporation of New York Application March 6, 1957, Serial No. 644,329

2 Claims. (Cl. 33—143)

The present invention relates to means for setting dial bore gages and particularly to such means which may be adjusted so that the dial bore gage may be set to various dimensions.

In the past dial bore gages have customarily been set to a master gage in the form of a ring thus requiring a new master for each dimension to be gaged and frequently for each variation in tolerance of a gage dimension.

The present invention provides an adjustable master for the setting of dial bore gages which is usable both for setting the dial bore gage of a particular size to any setting within its range and is furthermore usable to set bore gages of different sizes. It may thus replace an entire series of ring masters and reduce the cost of bore gaging operations by a very considerable amount.

The gage of the present invention is in many aspects similar to the gages disclosed in copending application Serial No. 479,771, filed January 4, 1955, now Patent No. 2,893,128, and Serial No. 568,572, filed February 29, 1956, the latter now abandoned, both of which applications are assigned to the assignee of the instant application. In the prior applications, however, the block which is utilized to centralize the bore gage in position when it is being set is located about the fixed anvil. It has been found that this arrangement has certain drawbacks, particularly in connection with the structure of the application, second mentioned above, and therefore the instant arrangement includes means for adjusting the position of the V block with respect to the movable anvil.

Further, the mode of adjusting the movable anvil in order to set the setting master varies in the present application from that shown in the prior applications and provides a uniform and repeatable pressure so that the setting of the gage master to gaging blocks, whether of the Johansson or Hoke type, is uniform and accurate.

It is an object of the invention to produce an adjustable setting master for dial bore gages, the master having a range of adjustability such that dial bore gages of a number of sizes may readily be set thereby.

It is another object of the invention to provide such a dial bore gage setting master having adjustable faces for contacting the centralizing plungers of the bore gage thus assuring that the gage will be set to a dimension exactly equal to the true diameter of the bore to be gaged.

It is a further object of the invention to provide these adjustable faces about the movable anvil thus rendering it easy to set the setting master by use of a proper stack of standard gage blocks and to thereafter utilize the adjustable faces for centralizing as set forth above.

Other objects and features of the invention will be apparent when the following description is considered in connection with the annexed drawings in which, Figure 1 is a perspective view showing the gage of the instant invention. In this figure the parts are positioned as they would be for setting the master to a stack of gage blocks and illustrative gage blocks are shown in dot-dash lines. In this view the setting master is shown with its "ways" extending vertically;

Figure 2 is a side elevational view of the setting master of Figure 1 showing particularly the mode of utilizing the master to set the dial bore gage. It will be noted that in this view the "ways" extend horizontally and that the setting master may be used in either of the two positions with equal facility although it is preferred that the position of Figure 1 be utilized since this arrangement provides greater convenience for holding the gage blocks in proper position while adjusting the movable anvil;

Figure 3 is a fragmentary top plan view of the gage of our invention when in the position indicated in Figure 2;

Figure 4 is a fragmentary cross-sectional view of the gage master of Figure 3, the view being taken on the plane of the line 4—4 of Figure 3. This view shows particularly the means for exerting a spring pressure on the movable plunger and for locking the plunger in a desired position against a stack of gaging blocks. The view also shows the means for adjusting the V block which cooperates with the dial bore gage centralizing plungers to centralize the gage in the setting master and to hold the V block in its adjusted position;

Figure 5 is a fragmentary transverse cross sectional view taken on the plane of the line 5—5 of Figure 2 and showing particularly the mode of locking the V-shaped plunger contacting face member to the slidable block and the means for locking the anvil plunger to that same block; and Figure 6 is a fragmentary transverse cross-sectional view taken on the plane of the line 6—6 of Figure 2 and showing particularly the means of locking the slidable block to the ways.

Referring now to the drawings and particularly to Figures 1 and 2, there is shown therein a frame generally designated 10 which comprises a web 11 generally triangular in shape having integrally formed therewith a base member 12 and a foot 13. As shown in Figure 1 the instrument is supported on the base 12. However, base 12 is provided at its rear edge with feet 14 which cooperate with the foot 13 so that the instrument may be placed in a horizontal position as is indicated in Figure 2. It will be noted that the base 12 is also provided with feet 15 on which the instrument rests when in a vertical position.

Mounted on the face of the web 11 and formed integral with that web is a plate 16 on which the ways 17 are fixed.

Fixedly mounted in the base 12, as for example by press-fitting in a bore therein, is a fixed anvil 18 which terminates in a ground and lapped face 20 comprising the actual anvil, the portion 18 being essentially a cylindrical shank. Movably mounted on the ways 17 is a slide block 21 which, as will be hereinafter described, may be locked to the ways in an adjusted position. Slide block 21 is shaped in the manner indicated particularly in Figures 1, 5 and 6, and is provided with two bores, one in either of the extending side portions thereof, these bores being designated 22.

A member 23 is formed in a generally rectangular shape having the portions thereof facing the anvil 20 provided with sloping surfaces forming essentially a V. The member 23 has a central longitudinal aperture therein through which an adjustable anvil extends as will be described hereinafter. Member 23 has fixed therein two rods 24 which extend into the apertures 22 thus forming guides for the movement of the block or member 23 with respect to the slide block 21. Member 23 may be locked in any adjusted position by means of the locking screws 25 which bear individually against the guide rods 24 as seen particularly in Figure 5.

Adjustable anvil 26, having a ground and lapped flat surface 27 and a round shank 28, is mounted in the slide block 21. This is accomplished by providing a bore 30 (Figures 4 and 5) in the block 21 and mounting therein a bushing 31 in which the shank 28 of the adjustable anvil 26 is mounted. Bushing 31 has a portion of its upper wall removed as indicated at 32 and a portion of the upper surface of the shank 28 is removed to form a flat area. A cavity 33 is formed in the slide block 21, the base of the cavity intersecting the bore 30. Mounted in the cavity 33 is a generally rectangular block 34 having a curved end as indicated at 36 (Figure 5) which fits under a lip 35 forming part of the wall of cavity 33. The rectangular locking block 34 at its opposite end or left hand edge, as seen in Figure 5, is provided with a depression having a semicircular outline and indicated at 37. The locking block 34 will thus be seen to bear against the flatted portion of the shank 28 and, when so pressed against it, will prevent any movement of the anvil 26.

A screw 38, having an enlarged portion 40, is threaded into the aperture 41 extending into the slide block 21 transversely to the anvil shank 28. The enlarged portion 40 of this screw 38 bears against the semicircular depression 37 in the locking block 34 and thus serves to lock the anvil in an adjusted position. It will be understood that the bore 30 and bushing 31, together with the anvil shank 28, are accurately formed so that the face 27 of this adjustable or movable anvil is flat and parallel to the corresponding face 20 of the fixed anvil 18.

The anvil 26 is spring pressed in a direction toward the fixed anvil 20 by means of a spring 42 which surrounds the left hand end of the shank 28 of anvil 26 and bears against a washer 43 fixed in a groove of the shank 28 at one end and against a washer 44 fixed to the left side of the slide block 21 at the opposite end. The washer 44 has a considerable thickness and the left hand end of the shank 28 normally lies within the bore in the washer as is indicated at 45. The position of the shank end 45 with respect to the surface of the washer is used as an indication of the proper pressure upon the gaging blocks and this is accomplished by so predetermining the strength of the spring that when a proper gaging pressure is exerted shank end 45 will be substantially flush with the surface of the washer 44.

The slide block 21 is mounted for movement longitudinally of the ways 17 and means are provided to lock the slide block in an adjusted position. This means is best shown in Figures 4 and 6 and comprises a T lock 46, the upright portion of which extends into a vertical bore in the undersurface of the slide block 21 and through the central slot 47 in the ways 17 and the head of which lies beneath the walls of slot 47. Extending into a transverse bore in the slide block 21 and intersecting the vertical bore just mentioned, is a locking rod 48 carrying a handle 50 in its outer end and having an eccentric portion 51 centrally thereof. This eccentric portion lies within a bore 52 extending transversely of the T member 46 and it will be obvious that as the locking rod 48 is rotated, the vertical position of the T member 46 is altered so that at its uppermost position it clamps the slide block to the ways.

A friction spring 53 is placed between the head of member 46 and the ways to increase the frictional engagement between the head and the underside of the ways.

As indicated particularly in Figures 1 and 2, centralizing caps designated 54 and 55 are provided, these caps being utilized during the setting operation to assure that the fixed contact of a dial bore gage is held in position on the fixed anvil 20. Two caps are provided in order to care for the different sizes of fixed contact points which are utilized for dial bore gages intended to cover different ranges of measurement. A stud 56 is provided in the base 12 in order to mount one of the two caps so that the caps will be out of the way when not in use and, as a precaution to prevent loss of either of the two caps, they are attached by any suitable means, for example by the beaded chain 57, to the base 12.

In utilizing the dial bore gage setting master described above, a stack of Johansson or Hoke blocks of the required dimension is wrung together in the usual manner. The guide block 21 is raised, the centralizing plunger block 23 is raised against the slide block 21 and locked in this position. The stack of wrung blocks is placed on the fixed anvil 20. The slide block 21 is then lowered until the adjustable anvil 26 seats against the uppermost surface of the stack and the spring 42 is compressed until the end 45 of shank 28 is flush with the outer surface of washer 44. Handle 50 is then operated to lock the slide block to the ways, the dimension between the fixed and movable anvils being then exactly that of the stack of blocks.

The proper centralizing cap 54 or 55 is then placed upon the fixed anvil 18. The centralizing block 23 is lowered so that the sloping surfaces thereof will make contact with the centralizing plungers of the bore gage and the bore gage is then placed with its fixed contact within the opening in the centralizing cap and its movable contact against the movable anvil face 27. By then rotating the bezel of the dial bore gage to a zero point the gage is set to the predetermined dimension and may be thereafter utilized to indicate variations from that dimension. It will, of course, be understood that the gage being set must lie within the range of measurement to which the setting master has been adjusted and that it may be necessary to change the range extension of the dial bore gage prior to the setting operation as outlined above.

It will also be seen that by use of the setting master a number of bore gages having a wide variety of measurement ranges may be set, thus permitting a single setting master to be substituted for a very great number of ring masters such as have been used in the past.

While we have described a preferred embodiment of the invention, it will be understood that we wish to be limited not by the foregoing description, but solely by the claims granted to us.

What is claimed is:

1. In a setting master for bore gages of the dial type, in combination, a base, a first gaging anvil having a flat face fixedly mounted on said base, guide means extending generally perpendicular to said face, a block slidably mounted on said guide means for movement toward and away from said first anvil, a second anvil having a flat face parallel to the face of said first anvil mounted in said block for sliding movement with respect thereto in a direction parallel to the movement of said block, a spring urging said second anvil towards said first anvil, a gage positioning member mounted on said block for limited movement with respect thereto in the direction perpendicular to said anvil faces, said positioning member having faces extending outwardly from said second gaging anvil at opposite sides thereof and at angles to the gaging anvil faces, said faces of said member serving to cooperate with the centralizing pins of a dial bore gage to assure that said gage is positioned to indicate the minimum distance between said gaging anvils in the direction perpendicular to the faces thereof and means for indicating when the force applied to said spring is at a fixed predetermined value.

2. A setting master for bore gages as claimed in claim 1, wherein said second anvil has a shank portion extending into an aperture through said block, and wherein said shank portion of said second anvil is provided with a flat area which cooperates with a locking member caused to press against said flat area by means of a screw threadedly engaging an aperture in said block and having a shoulder bearing against said locking member, said second anvil having a shank of predetermined length and so arranged as to become flush with a surface of said block intersected by said aperture each time said resilient means is compressed to the same extent.

References Cited in the file of this patent

UNITED STATES PATENTS

| | | |
|---|---|---|
| 477,183 | McLane | June 14, 1892 |
| 1,243,568 | Steczynski | Oct. 16, 1917 |
| 1,307,347 | Cumner et al. | June 24, 1919 |
| 1,314,888 | Mitchell | Sept. 2, 1919 |
| 1,341,865 | Solberg | June 1, 1920 |
| 1,591,259 | Ames | July 6, 1926 |
| 1,617,284 | Ames | Feb. 8, 1927 |
| 2,152,058 | King | Mar. 28, 1939 |
| 2,725,636 | Green | Dec. 6, 1955 |

FOREIGN PATENTS

| | | |
|---|---|---|
| 103,015 | Germany | May 12, 1899 |